United States Patent
Cha et al.

(10) Patent No.: US 7,257,830 B2
(45) Date of Patent: Aug. 14, 2007

(54) MOBILE ELECTRONIC APPARATUS CAPABLE OF FUNCTIONING AS IMAGE REPRODUCTION MEDIUM AND REPRODUCTION METHOD THEREOF

(75) Inventors: Dong-Il Cha, Suwon (KR); Joo-young Kwon, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 100 days.

(21) Appl. No.: 10/777,673

(22) Filed: Feb. 13, 2004

(65) Prior Publication Data

US 2004/0160193 A1    Aug. 19, 2004

(30) Foreign Application Priority Data

Feb. 18, 2003    (KR) .................... 10-2003-0010154

(51) Int. Cl.
    *H04N 7/18*    (2006.01)
(52) U.S. Cl. .......................................... 725/74; 725/78
(58) Field of Classification Search ............. 315/169.3; 348/838; 725/74–77, 78
    See application file for complete search history.

(56) References Cited

U.S. PATENT DOCUMENTS 6,380,978 B1 *  4/2002  Adams et al. .............. 348/452
6,594,721 B1 *  7/2003  Sakarda et al. ............. 710/304
7,050,124 B2 *  5/2006  Schedivy ................... 348/838

FOREIGN PATENT DOCUMENTS

| JP | 11-346166   | 12/1999 |
| JP | 2001-523024 | 11/2001 |
| JP | 2002-209175 | 7/2002  |
| KR | 20-221378   | 4/2001  |
| KR | 2001-58754  | 7/2001  |

OTHER PUBLICATIONS

Korean Official Action issued in Korean Patent Application No. 2003-10154 filed Feb. 18, 2003 by the Korean Intellectual Property Office on May 30, 2005.
Japanese Office Action for Application No. 2004-040458; mailed Apr. 11, 2006.

* cited by examiner

*Primary Examiner*—Sara Crane
(74) *Attorney, Agent, or Firm*—Staas & Halsey LLP (57) ABSTRACT

A mobile electronic apparatus functions as an image medium reproducer, and, in particular, a moving image, such as a DVD reproducer. The mobile electronic apparatus has a mobile body, and a mobile stand detachably connectable with the mobile body. While the mobile apparatus body is connected to the mobile apparatus stand, the mobile apparatus body performs auralization and visualization of at least one A/V (Audio/Video) signal based on at least one input A/V signal from an A/V storage medium and at least one input body control signal output from the mobile apparatus stand, and outputs at least one stand control signal controlling the A/V signal output by the mobile apparatus stand. When the mobile apparatus body is disconnected from the mobile apparatus stand, the mobile apparatus body operates as an independent mobile electronic apparatus.

12 Claims, 4 Drawing Sheets

MOBILE ELECTRONIC APPARATUS CAPABLE OF FUNCTIONING AS IMAGE REPRODUCTION MEDIUM AND REPRODUCTION METHOD THEREOF

CROSS-REFERENCE TO RELATED APPLICATIONS

This application claims the benefit of Korean Patent Application No. 2003-10154, dated Feb. 18, 2003, in the Korean Intellectual Property Office, the disclosure of which is incorporated herein by reference.

BACKGROUND OF THE INVENTION

1. Field of the Invention

The present invention relates to a mobile electronic apparatus functioning as an image reproduction medium, and a reproduction method thereof, and more particularly to a mobile electronic apparatus including a detachable mobile apparatus stand, in which the mobile electronic apparatus operates as an independent mobile electronic apparatus when being disconnected from the mobile apparatus stand, and functions as an image reproduction medium (i.e., an image medium, typically, a moving image medium reproducer), such as a DVD (Digital Video Disc) reproducer (player) when being connected to the mobile apparatus stand, as well as a reproduction method of such an image reproduction medium.

2. Description of the Related Art

With the development of recent digital technology, various functional mobile electronic apparatuses have been released in the market. In general, these mobile electronic apparatuses have a characteristic of convenient portability, but they also have functional restrictions resulting from limitations in size and weight. To be specific, they are suitable for access to Internet or reproduction (execution) of various application programs, but they place several restrictions on the exerting (execution or availability) of functions for reproducing multimedia, such as a DVD and so on. Generally, conventional mobile electronic apparatuses include a detachable mobile apparatus stand. This mobile apparatus stand has typical functions, and in particular main functions, such as, for example, a power supply function for supplying electric power to the mobile electronic apparatus, an interface function for allowing the mobile electronic apparatuses to perform data communication with others, and so forth.

SUMMARY OF THE INVENTION

Accordingly, the present invention relates to solving the above-mentioned and/or other problems that occur in the related art. The present invention provides a mobile electronic apparatus functioning as an image reproduction medium (i.e., an image medium reproducer), and in particular a moving image storage medium, such as a DVD, reproducer when connected to a mobile apparatus stand by compensating (allowing) an image medium reproduction function in addition to the fundamental functions of the mobile apparatus stand as mentioned above. The present invention also provides a method of reproducing from an image medium through a mobile electronic apparatus.

Additional aspects and/or advantages of the invention will be set forth in part in the description which follows and, in part, will be obvious from the description, or may be learned by practice of the invention.

The present invention may be achieved by a mobile electronic apparatus functioning as an image reproduction medium (i.e., an image medium reproducer), comprising a mobile apparatus body; and a mobile apparatus stand detachably connected with the mobile apparatus body, wherein, while the mobile apparatus body is connected to the mobile apparatus stand, the mobile apparatus body performs auralization and visualization of at least one A/V (Audio/Video) signal based on an input A/V signal and at least one input body control signal output from the mobile apparatus stand, the mobile apparatus body outputs at least one stand control signal controlling an operation of the mobile apparatus stand, and when the mobile apparatus body is disconnected from the mobile apparatus stand, the mobile apparatus body operates as an independent mobile electronic apparatus, and wherein, while the mobile apparatus stand is connected to the mobile apparatus body, the mobile apparatus stand outputs both the A/V signal and the body control signal to the mobile apparatus body based on the input stand control signal output from the mobile apparatus body, wherein the output A/V signal is reproduced from an A/V storage medium, and the output body control signal controls the operation of the mobile apparatus body.

According to an aspect of the present invention, the mobile apparatus stand comprises an A/V storage medium reproduction unit reproducing and outputting the A/V signal from an A/V storage medium based on the stand control signal input from the mobile apparatus body and for outputting the body control signal for controlling the operation of the mobile apparatus body; and a body interface unit receiving both the A/V signal output from the A/V storage medium reproduction unit and the body control signal controlling the mobile apparatus body when connected with the mobile apparatus body, outputting the received A/V signal and the body control signal to the mobile apparatus body, and interconnecting signals input/output between the mobile apparatus body and the A/V storage medium reproduction unit by receiving the stand control signal input from the mobile apparatus body and outputting the received stand control signal to the A/V storage medium reproduction unit.

According to an aspect of the present invention, the A/V storage medium reproduction unit comprises a disc reproducer reproducing and outputting the A/V signal from the A/V storage medium; an A/V decoder receiving and decoding the A/V signal output from the disc reproducer and outputting the decoded A/V signal to the body interface unit; an A/V key input section applying at least one key input signal; an A/V memory temporarily storing and outputting the A/V signal; and an A/V controller controlling operations of disc reproducer, the A/V decoder and the A/V memory based on the key input signal applied from the A/V key input section and the stand control signal input from the mobile apparatus body, and for outputting the body control signal controlling the operation of the mobile apparatus body to the body interface unit.

According to an aspect of the invention, the body interface unit comprises an A/D converter performing A/D conversion of the decoded analog A/V signal output from the A/V decoder into a digital A/V signal based on the control signal input from the A/V controller, and outputting the converted digital A/V signal; and an A/V connector receiving the digital A/V signal output from the A/D converter to output the received digital A/V signal to the mobile apparatus body when the mobile apparatus stand is connected with the mobile apparatus body, and receiving the body control signal output from the A/V storage medium reproduction unit to output the received body control signal to the mobile apparatus body, receiving the stand control signal output from the mobile apparatus body to output the received stand control signal to the A/V storage medium reproduction unit, and connecting signals input/output between the mobile apparatus body and the A/V storage medium reproduction unit.

According to an aspect of the invention, the mobile apparatus body comprises a stand interface unit sensing whether connected with the mobile apparatus stand when being connected with the mobile apparatus stand, outputting the sensed connection signal, and interconnecting the input A/V signal and body control signal output from the mobile apparatus stand and the stand control signal output to the mobile apparatus stand; and a mobile unit performing auralization and visualization of the A/V signal based on the sensed connection signal and the body control signal input from the stand interface unit and outputting the stand control signal controlling the mobile apparatus stand.

According to an aspect of the invention, the stand interface unit comprises a stand connection sensor sensing whether connected with the mobile apparatus stand when being connected with the mobile apparatus stand and outputting the sensed connection signal; and a mobile connector connecting signals input/output between the mobile apparatus stand and the mobile unit while connected with the mobile apparatus stand.

According to an aspect of the invention, the mobile unit comprises a mobile key input section applying at least one key input signal; a mobile controller generally controlling operations of components constituting the mobile unit based on both the sensed connection signal and the body control signal input from the stand interface unit and the key input signal applied from the mobile key input section, and outputting the stand control signal controlling the operation of the mobile apparatus stand; a mobile memory for uploading video data which has already been stored, various application programs, and an application program for reproducing the A/V signal, to the mobile controller based on the control signal output from the mobile controller; a signal multiplexer alternatively switching the A/V signal output from the stand interface unit and the video data output from the mobile controller based on the control signal output from the mobile controller, and outputting the switched resultant(s); a display driver outputting at least one display driving signal for representing at least one VIDEO signal based on both the signal output from the signal multiplexer and the control signal output from the mobile controller; a display representing the VIDEO signal based on the display driving signal output from the display driver; an audio controller outputting at least one audio signal for auralizing the AUDIO signal based on both the signal output from the signal multiplexer and the control signal input from the mobile controller; and a speaker for auralizing the audio signal output from the audio control part.

According to an aspect of the present invention, the A/V storage medium is a DVD (Digital Video Disc).

The present invention may also be achieved by a method of reproducing from an image reproduction medium through a mobile electronic apparatus, the mobile electronic apparatus having a detachable mobile apparatus stand, the method comprising activating an operation of the mobile electronic apparatus when the mobile electronic apparatus is connected to the mobile apparatus stand; when at least one reproduction key signal is input, reproducing at least one A/V (Audio/Video) signal from a video medium in the mobile apparatus stand and outputting the reproduced A/V signal to the mobile electronic apparatus; and performing auralization and visualization of the A/V signal input from the mobile apparatus stand at the mobile electronic apparatus.

According to an aspect of the present invention, the auralization and visualization comprises alternatively reproducing the A/V signal input from the mobile apparatus stand and video data already stored by the mobile electronic apparatus.

According to an aspect of the present invention, wherein the mobile apparatus stand reproduces based on at least one key input signal applied from the mobile electronic apparatus and at least one key input signal applied from the mobile apparatus stand, while being connected with the mobile electronic apparatus.

Also, according to an aspect of the present invention, the mobile apparatus stand and the mobile electronic apparatus perform mutual inputting/outputting of control signals controlling mutual operations through a UART (Universal asynchronous receiver/transmitter).

BRIEF DESCRIPTION OF THE DRAWINGS

The above and/or other aspects, features and advantages of the present invention will be become more apparent from the following detailed description of the example embodiments taken in conjunction with the accompanying drawings, in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
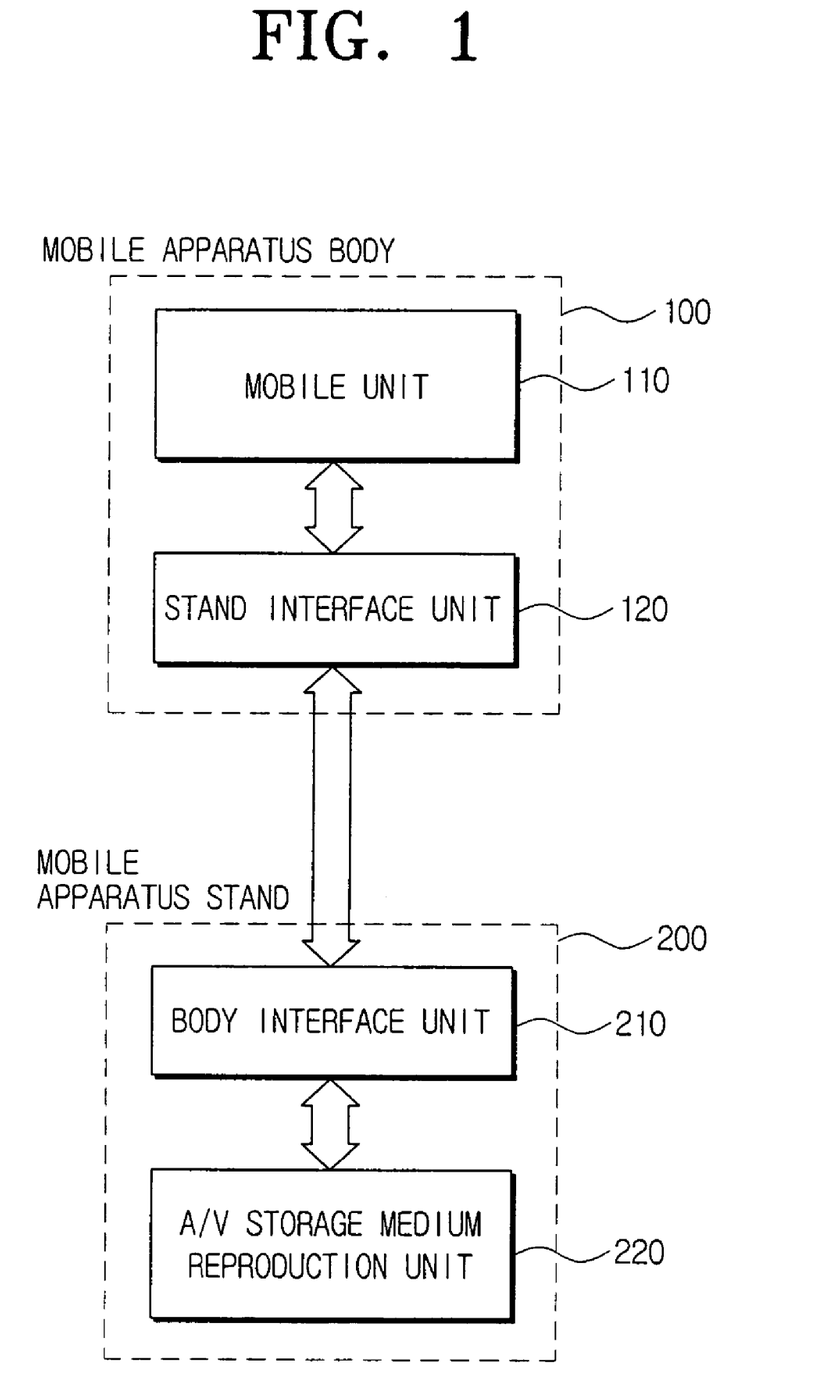
FIG. 1 is a functional block diagram of a mobile electronic apparatus functioning as an image medium reproducer, according to an embodiment of the present invention.

FIG. 1 is a functional block diagram of a mobile electronic apparatus functioning as an image medium reproducer, in accordance with an embodiment of the present invention. A mobile apparatus body 100 is detachably connected to a mobile apparatus stand 200. The mobile apparatus body 100 comprises a mobile unit 110 generally controlling the mobile apparatus unit 110 and a stand interface unit 120 interfacing with the mobile apparatus stand 200. The mobile apparatus stand 200 comprises a body interface unit 210 interfacing with the mobile apparatus body 100, and an A/V storage medium reproduction unit 220 reproducing multimedia data from a multimedia storage medium, such as a DVD, etc.

While being connected to the mobile apparatus stand 200, the mobile apparatus body 100 reproduces at least one audio/video signal (hereinafter, abbreviated to "A/V signal") by auralization and visualization of the A/V signal, based on at least one input A/V signal and one input body control signal output from the mobile apparatus stand 200. Further, the mobile apparatus body 100 outputs at least one stand control signal for controlling an operation of the mobile apparatus stand 200, and operates as an independent mobile electronic apparatus when being disconnected from the mobile apparatus stand 200.

While being connected with the mobile apparatus body 100, the mobile apparatus stand 200 reproduces at least one A/V signal from an A/V storage medium (not shown) based on the stand control signal output from the mobile apparatus body 100. Further, the mobile apparatus stand 200 outputs the body control signal for controlling an operation of the mobile apparatus body 100.

Figure 2:
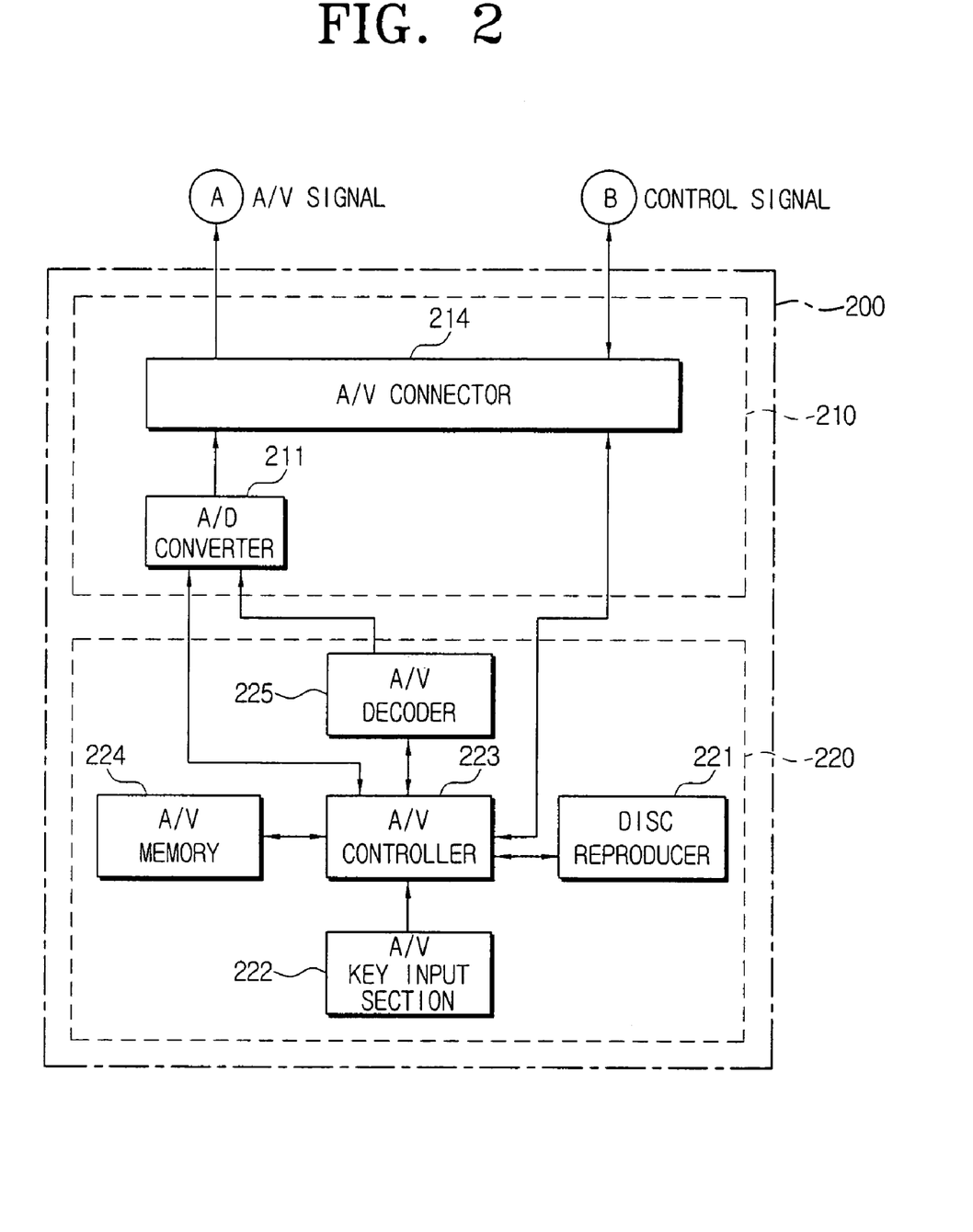
FIG. 2 is a detailed functional block diagram of the mobile apparatus stand of FIG. 1, according to an embodiment of the present invention.

A detailed description will be made regarding a construction of the mobile apparatus stand 200 in reference to FIG. 2. FIG. 2 is a detailed functional block diagram of the mobile apparatus stand 200 of FIG. 1, according to an embodiment of the present invention. As shown, the mobile apparatus stand 200 includes an A/V storage medium reproduction unit 220 and a body interface unit 210. The A/V storage medium reproduction unit 220 reproduces the A/V signal from an A/V storage medium (not shown), such as a DVD, based on the stand control signal input from the mobile apparatus body 100 and outputs the reproduced A/V signal to the body interface unit 210. In addition, the A/V storage medium reproduction unit 220 outputs the body control signal for controlling an operation of the mobile apparatus body 100 to the body interface unit 210.

Also, while the mobile apparatus stand 200 is connected with the mobile apparatus body 100, the body interface unit 210 receives both the A/V signal output from the A/V storage medium reproduction unit 220 and the body control signal output from the A/V storage medium reproduction unit 220, and outputs the received A/V signal A and the body control signal B to the mobile apparatus body 100, and the body interface unit 210 receives the stand control signal B input from the mobile apparatus body 100 to output the received stand control signal to the A/V storage medium reproduction unit 220, thereby the body interface unit 210 interconnects signals input/output between the mobile apparatus body 100 and the A/V storage medium reproduction unit 220.

Typically, the A/V storage medium reproduction unit 220 comprises a disc reproducer 221, an A/V decoder 225, an A/V key input section 222, an A/V memory 224 and an A/V controller 223. The disc reproducer 221 reproduces the A/V signal from the A/V storage medium and outputs the reproduced A/V signal to the A/V controller 223. According to an aspect of the present invention, the A/V storage medium is a DVD (Digital Video Disc).

The A/V key input section 222 applies at least one key input signal to the A/V controller 223. The A/V controller 223 outputs the reproduced A/V signal input from the disc reproducer 221 to the A/V decoder 225, typically, based on the key input signal applied from the A/V key input section 222 and the stand control signal input from the mobile apparatus body 100. Further, the A/V controller 223 outputs the body control signal for controlling an operation of the mobile apparatus body 100 to the body interface unit 210.

Meanwhile, typically, the A/V memory 224 temporarily stores the A/V signal reproduced from the disc reproducer 221 based on the control signal of the A/V controller 223, and outputs the stored A/V signal to the A/V controller 223. The A/V decoder 225 decodes the A/V signal input from the A/V controller 223 based on at least one control signal of the A/V controller 223 and outputs the decoded data to the body interface unit 210.

Typically, the body interface unit 210 comprises an A/D converter 211 and an A/V connector 214. The A/D converter 211 converts the decoded analog A/V signal input from the A/V decoder 225 into a digital A/V signal based on a control signal input from the A/V controller 223, and outputs the A/D converted digital A/V signal to the A/V connector 214.

The A/V connector 214 interconnects signals input/output between the mobile apparatus body 100 and the A/V storage medium reproduction unit 220. That is, while the mobile apparatus stand 200 is connected with the mobile apparatus body 100, the A/V connector 214 receives the digital A/V signal output from the A/D converter 211 and outputs the received digital A/V signal A to the mobile apparatus body 100, and receives the body control signal output from the A/V controller 223 and outputs the received body control signal B to the mobile apparatus body 100. Further, the A/V connector 214 receives the stand control signal B input from the mobile apparatus body 100 and outputs the received stand control signal to the A/V controller 223.

Figure 3:
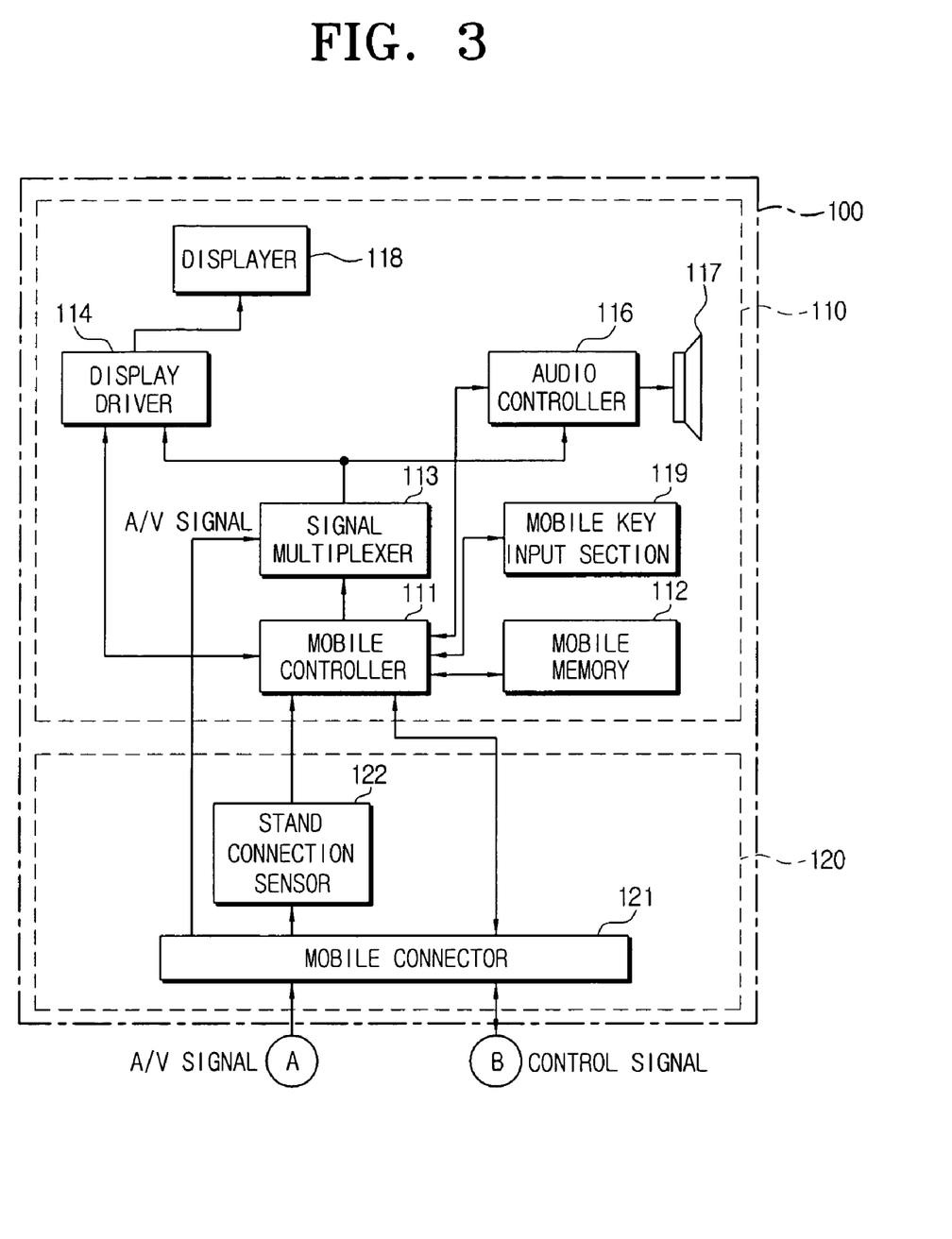
FIG. 3 is a detailed functional block diagram of the mobile apparatus body of FIG. 1, according to an embodiment of the present invention.

Operation of the mobile apparatus body 100 will be described in detail in reference with FIG. 3. FIG. 3 is a detailed functional block diagram of the mobile apparatus body 100 of FIG. 1, according to an embodiment of the present invention. As shown, the mobile apparatus body 100 generally and typically comprises a mobile unit 110 and a stand interface unit 120. The stand interface unit 120 senses whether the mobile apparatus body 100 is exactly connected to the mobile apparatus stand 200 and outputs the sensed connection signal to the mobile unit 110. Further, the stand interface unit 120 interconnects, between the mobile body 100 and the mobile stand 200, the A/V signal A and the body control signal B input from the mobile apparatus stand 200, and the stand control signal B output to the mobile apparatus stand 200.

The mobile unit 110 performs auralization and visualization of the A/V signal received from the stand interface unit 120 based on the sensed connection signal and the body control signal input from the stand interface unit 120 and outputs the stand control signal for controlling the mobile apparatus stand 200.

Typically, the stand interface unit 120 comprises a stand connection sensor 122 and a mobile connector 121. The stand connection sensor 122 outputs the sensed connection signal to the mobile unit 110, wherein the sensed connection signal is generated by sensing whether the mobile apparatus body 100 is exactly connected to the mobile apparatus stand 200. The mobile connector 121 interconnects signals input/output between the mobile apparatus stand 200 and the mobile unit 110.

Meanwhile, typically, the mobile unit 110 comprises a mobile key input section 119, a mobile controller 111, a mobile memory 112, a signal multiplexer 113, a display driver 114, a displayer (display unit) 118, an audio controller 116 and a speaker 117. The mobile key input section 119 applies a key input signal to the mobile controller 111. The mobile controller 111 generally and typically controls operations of components constituting the mobile unit 110 based on the sensed connection signal and the body control signal input from the stand interface unit 120, and the key input signal applied from the mobile key input section 119. The mobile controller 111 outputs the stand control signal for controlling an operation of the mobile apparatus stand 200 to the mobile connector 121.

Meanwhile, the mobile memory 112 outputs other image data, such as other images, moving multimedia data, video data, DVD data, etc., which has already been stored in the mobile memory 112 (i.e., internally or locally supplied image data), outputs data for various application programs, and outputs data for an application program for reproducing (i.e., displaying) A/V signals (internal or external from the mobile stand 200, as the case may be) to the mobile controller 111, based on a control signal output from the mobile controller 111. The mobile memory 112 can be any known type of non-volatile and/or volatile data storage.

When, for example, the stored video data are input from the mobile memory 112, the mobile controller 111 outputs the input video data to the signal multiplexer 113. The signal multiplexer 113 alternatively switches the input A/V signal output from the mobile connector 121 and the stored video data output from the mobile controller 111 based on a control signal output from the mobile controller 111. The signal multiplexer 113 outputs the switched result(s) to the display driver 114 and the audio controller. Here, in a mode for reproducing the A/V signals (data) input from the mobile apparatus stand 200 according to the key input signal applied from the mobile key input section 119, the mobile controller 111 controls the signal multiplexer 113 so that the signal multiplexer 113 selects and switches to the A/V signal output from the mobile connector 121 (i.e., externally supplied image data). In contrast, in a mode for reproducing the stored video data of the mobile memory 112 according to the key input signal applied from the mobile key input section 119, the mobile controller 111 controls the signal multiplexer 113 so that the signal multiplexer 113 selects and switches to the A/V signal output from the mobile memory 112 via the mobile controller 111.

Meanwhile, the display driver 114 drives the displayer (display unit) 118 to represent (display) the VIDEO signal (internally or externally supplied video) input from the signal multiplexer 113 on the displayer 118 based on a control signal output from the mobile controller 111. The displayer 118 represents the image (VIDEO) signal based on a display driving signal output from the display driver 114.

The audio controller 116 outputs at least one audio signal for driving the speaker 117 so as to auralize the AUDIO signal (internally or externally supplied audio signal) input from the signal multiplexer 113 based on a control signal output from the mobile controller 111.

When the mobile connector 121 of the mobile body 100 is connected with the A/V connector 214 of the mobile stand 200, the mobile controller 111 of the mobile body 100 applies the key input signal, which is input from the mobile key input section 119, to the A/V controller 223 of the mobile stand 200 via the mobile connector 121 and the A/V connector 214. Thus, the A/V controller 223 can operate based on both the key input signal applied from the mobile key input section 119 of the mobile body 100 and the key input signal applied from the A/V key input section 222 of the mobile stand 200.

Additionally, in a sleep mode, the mobile controller 111 controls an operation mode of each component constituting the mobile apparatus body 100 into an activation mode based on the sensed connection signal input from the stand connection sensor 122 when the mobile apparatus body 100 is connected to the mobile apparatus stand 200.

Typically, the mobile controller 111 and the A/V controller 223 perform mutual input/output of the stand control signal and the body control signal (or other control signals), respectively, through respective UART (Universal asynchronous receiver/transmitter) communication ports.

Figure 4:
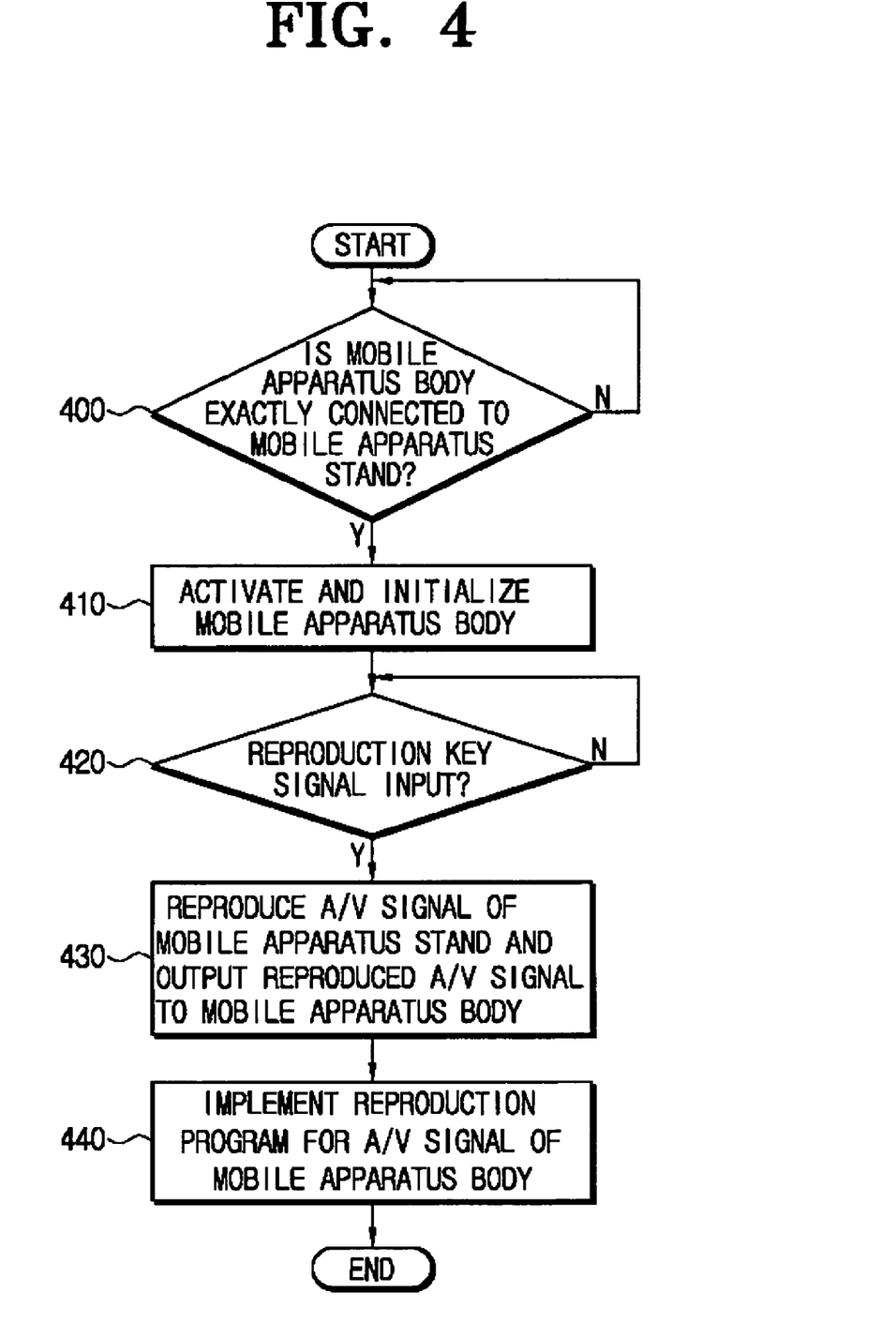
FIG. 4 is a flow chart of operating a mobile electronic apparatus functioning as an image medium reproducer, in accordance with an embodiment of the present invention.

Hereinafter, a brief description will be made regarding a reproduction method of an image medium through a mobile electronic apparatus according to the present invention with reference to FIG. 4. FIG. 4 is a flow chart of operating a mobile electronic apparatus functioning as an image medium reproducer, in accordance with an embodiment of the present invention.

At operation 400, the stand connection sensor 122 of the mobile apparatus body 100 senses whether the mobile apparatus body 100 is exactly connected with the mobile apparatus stand 200, and outputs the sensed connection signal to the mobile controller 111. If determined at operation 400 that the mobile apparatus body 100 is not exactly connected with the mobile apparatus stand 200, the mobile controller 111 repeats operation 400. However, if determined at operation 400 that the mobile apparatus body 100 is exactly connected with the mobile apparatus stand 200, at operation 410, the mobile controller 111 changes an operation mode of each component constituting the mobile apparatus body 100 from a sleep mode to an activation mode, and, if necessary, initializes an operation of the mobile apparatus body 100, such a battery recharge, data synchronization, etc.

At operation 420, during a connection of the mobile apparatus body 100 with the mobile apparatus stand 200, the A/V controller 223 of the mobile stand 200 determines whether a reproduction key signal is applied to the A/V controller 223. If, at operation 420, a reproduction key signal is not applied, the A/V controller 223 repeats operation 420. By contrast, if, at operation 420, a reproduction key signal is applied, at operation 430, the A/V controller 223 reproduces an A/V signal from an A/V storage medium (moving image medium), such as a DVD. More particularly, at operation 430, the mobile apparatus stand 200 extracts and decodes at least one A/V signal from the A/V storage medium, such as a DVD, and outputs the resultant decoded data (typically as converted from analog to digital data via the A/D converter 211 of the mobile stand 200) to the mobile apparatus body 100.

Subsequently, at operation 440, the mobile apparatus body 100 auralizes and visualizes at least one A/V signal input from the mobile apparatus stand 200. More particularly, at operation 440, the mobile controller 111 implements (executes) an application reproduction (presentation) program for the A/V signal of the mobile body 100, which can be input either from the mobile stand 200 and/or the mobile body memory 112. Further, typically, at operation 440, the mobile apparatus body 100 can alternatively reproduce the A/V signal input from the mobile apparatus stand 200 and other image (e.g., other video, picture, etc.) data already stored by the mobile memory 112 of the mobile apparatus body 100.

In operation 430, when the mobile apparatus stand 200 is connected with the mobile apparatus body 100, typically, the mobile apparatus stand 200 operates based on a key input signal applied from the mobile apparatus body 100 and a key input signal applied from the mobile apparatus stand 200 via the respective mobile controller 111 and the A/V controller 223 in response to the respective key input sections 119 and 222.

Typically, the mobile apparatus stand 200 and the mobile apparatus body 100 perform mutual input/output of control signals B for controlling mutual operations therebetween through communication ports for respective UARTs in the mobile stand 200 and mobile body 100. In regard to transmission of A/V signals A from the mobile stand 200 to the mobile body 100, any known data communication specification/protocol suitable for multimedia traffic therebetween can be used.

The foregoing description has been made regarding a mobile apparatus stand and a dedicated mobile apparatus compatibly attachable with the mobile apparatus stand. However, the present invention is not limited to such a configuration, and a mobile apparatus stand having an image, such as a DVD, picture, etc., reproduction function according to the present invention can reproduce A/V signals using a standard communication specification and an interface for other typical mobile equipment not compatibly attachable to the mobile apparatus stand.

According to the mobile electronic apparatus functioning as an image reproduction medium and the reproduction method thereof, when the mobile apparatus body is disconnected from the mobile apparatus stand, the mobile electronic apparatus allows the mobile apparatus body to be operated as a typical mobile electronic apparatus. When the mobile apparatus body is connected to the mobile apparatus stand, the mobile electronic apparatus can reproduce from an image storage medium, such as a DVD, other image (picture) media, etc., so that it can multiply (enhance) the functions of the mobile electronic apparatus. The above-described processes of the present invention can be implemented in software and/or computing hardware. More particularly, the present invention provides a mobile electronic apparatus that functions as an image medium reproducer, and, in particular, a moving image, such as a DVD reproducer. The mobile electronic apparatus has a mobile body, and a mobile stand detachably connectable with the mobile body. While the mobile apparatus body is connected to the mobile apparatus stand, the mobile apparatus body performs auralization and visualization of at least one A/V (Audio/Video) signal based on at least one input A/V signal from an A/V storage medium and at least one input body control signal output from the mobile apparatus stand, and outputs at least one stand control signal controlling the A/V signal output by the mobile apparatus stand. Therefore, the present invention provides an apparatus, comprising a mobile electronic apparatus comprising a data communication interface, a display, and a controller controlling moving multimedia data receipt via the data communication interface and driving the display to display the moving multimedia data; and a mobile apparatus stand detachably connectable with the mobile electronic apparatus and comprising a data communication interface, a moving multimedia data storage reproducer, and a controller controlling a digital reproduction of the moving multimedia data and transmission of the digital moving multimedia data to the mobile electronic apparatus for display via the respective data communication interfaces, in response to an input reproduction command at the mobile electronic apparatus and/or at the mobile apparatus stand. Further the present invention provides, a mobile electronic apparatus, comprising a data communication interface; a display; and a controller controlling external digital video disc (DVD) data communication receipt via the data communication interface and driving the display to display the DVD data. The mobile apparatus further comprises an A/V signal multiplexer controlled by the controller to switch between the externally supplied DVD data and internally supplied multimedia data.

While a few embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. A mobile electronic apparatus functioning as an image medium reproducer, comprising:
   a mobile apparatus body; and
   a mobile apparatus stand detachably connected with the mobile apparatus body, such that when the mobile apparatus body is connected to the mobile apparatus stand, the mobile apparatus body operates in conjunction with the mobile apparatus stand, and when the mobile apparatus body is disconnected from the mobile apparatus stand, the mobile apparatus body operates independently from the mobile apparatus stand as an independent mobile electronic apparatus,
   wherein, while the mobile apparatus body is connected to the mobile apparatus stand,
      the mobile apparatus body performs auralization and visualization of at least one A/V (Audio/Video) signal based on at least one input A/V signal and one input body control signal output from the mobile apparatus stand,
      the mobile apparatus body outputs at least one stand control signal controlling an operation of the mobile apparatus stand, and
      when the mobile apparatus body is disconnected from the mobile apparatus stand, the mobile apparatus body operates as an independent mobile electronic apparatus, and
   wherein, while the mobile apparatus stand is connected to the mobile apparatus body,
      the mobile apparatus stand outputs both the A/V signal and the body control signal to the mobile apparatus body based on the input stand control signal output from the mobile apparatus body, wherein the A/V signal is reproduced from an A/V storage medium, and the body control signal controls an operation of the mobile apparatus body.

2. The mobile electronic apparatus as claimed in claim 1, wherein the mobile apparatus stand comprises:
   an A/V storage medium reproduction unit reproducing and outputting the A/V signal from the A/V storage medium based on the input stand control signal from the mobile apparatus body and outputting the body control signal controlling the operation of the mobile apparatus body; and
   a body interface unit, when the mobile apparatus stand is connected to the mobile apparatus body,
      receiving both the A/V signal output from the A/V storage medium reproduction unit and the body control signal controlling the mobile apparatus body, and outputting the received A/V signal and the received body control signal to the mobile apparatus body, and
      interconnecting signals input/output between the mobile apparatus body and the A/V storage medium reproduction unit by receiving the input stand control signal from the mobile apparatus body and outputting the received stand control signal to the A/V storage medium reproduction unit.

3. The mobile electronic apparatus as claimed in claim 2, wherein the A/V storage medium reproduction unit comprises:
   a disc reproducer reproducing and outputting the A/V signal from the A/V storage medium;
   an A/V decoder receiving and decoding the A/V signal output from the disc reproducer and outputting the decoded analog A/V signal to the body interface unit;
   an A/V key input section applying at least one key input signal;
   an A/V memory temporarily storing and outputting the A/V signal; and
   an A/V controller controlling operations of the disc reproducer, the A/V decoder and the A/V memory based on at least one of the key input signal applied from the A/V key input section and the input stand control signal from the mobile apparatus body, and outputting the body control signal to control the operation of the mobile apparatus body to the body interface unit.

4. The mobile electronic apparatus as claimed in claim 3, wherein the body interface unit comprises:
  an A/D converter performing A/D conversion of the input decoded analog A/V signal output from the A/V decoder into a digital A/V signal based on a control signal input from the A/V controller, and outputting the converted digital A/V signal; and
  an A/V connector, when the mobile apparatus stand is connected with the mobile apparatus body,
    receiving the digital A/V signal output from the A/D converter to output the received digital A/V signal to the mobile apparatus body,
    receiving the body control signal output from the A/V storage medium reproduction unit to output the received body control signal to the mobile apparatus body,
    receiving the input stand control signal from the mobile apparatus body to output the received stand control signal to the A/V storage medium reproduction unit, and
  connecting signals input/output between the mobile apparatus body and the A/V storage medium reproduction unit.

5. The mobile electronic apparatus as claimed in claim 1, wherein the mobile apparatus body comprises:
  a stand interface unit sensing whether connected with the mobile apparatus stand, outputting the sensed connection signal, and interconnecting the input A/V signal and the input body control signal from the mobile apparatus stand and the stand control signal output to the mobile apparatus stand; and
  a mobile unit performing auralization and visualization of the input A/V signal based on the sensed connection signal and the input body control signal from the stand interface unit, and outputting the stand control signal controlling the mobile apparatus stand.

6. The mobile electronic apparatus as claimed in claim 5, wherein the stand interface unit comprises:
  a stand connection sensor generating the sensed connection signal; and
  a mobile connector connecting signals input/output between the mobile apparatus stand and the mobile unit, when the mobile apparatus body is connected with the mobile apparatus stand.

7. The mobile electronic apparatus as claimed in claim 5, wherein the mobile unit comprises:
  a mobile key input section applying at least one key input signal;
  a mobile controller controlling operations of components constituting the mobile unit based on at least one of the sensed connection signal, the input body control signal from the stand interface unit, and the key input signal applied from the mobile key input section, and outputting the stand control signal controlling the operation of the mobile apparatus stand;
  a mobile memory uploading internally supplied multimedia data, various application programs, and an application program reproducing A/V signals, to the mobile controller based on a control signal from the mobile controller;
  a signal multiplexer alternatively switching between the input A/V signal output from the stand interface unit and the multimedia data output from the mobile controller based on a reproduction control signal output from the mobile controller, and outputting the switched data signals;
  a display driver outputting at least one display driving signal representing at least one image signal based on both the data signals from the signal multiplexer and a display control signal output from the mobile controller;
  a displayer representing the image signal based on the display driving signal output from the display driver;
  an audio controller outputting at least one audio signal for auralizing an audio signal based on both the data signals from the signal multiplexer and an audio control signal output from the mobile controller; and
  a speaker auralizing the audio signal output from the audio controller.

8. The mobile electronic apparatus as claimed in claim 7, wherein the mobile controller applies the key input signal to the mobile apparatus stand via the stand interface unit of the mobile apparatus body, when the mobile apparatus body is connected with the mobile apparatus stand according to the sensed connection signal, and allows the mobile apparatus body and the mobile apparatus stand to be operated based on the key input signal applied from the mobile key input section of the mobile apparatus body.

9. The mobile electronic apparatus as claimed in claim 7, wherein the mobile controller controls an operation mode of each component constituting the mobile apparatus body into an activation mode based on the input sensed connection signal from the stand interface unit, when the mobile apparatus body is connected with the mobile apparatus stand and while the mobile apparatus body is in a sleep mode.

10. A mobile electronic apparatus as claimed in claim 1, wherein the mobile apparatus body and the mobile apparatus stand comprise respective Universal asynchronous receiver/transmitter communication ports, and perform mutual input/output of the stand control signal and the body control signal, respectively, through the respective UART communication ports.

11. The mobile electronic apparatus as claimed in claim 1, wherein the A/V storage medium is a DVD (Digital Video Disc).

12. An apparatus, comprising:
  a mobile electronic apparatus comprising a data communication interface, a display, and a controller controlling moving multimedia data receipt via the data communication interface and driving the display to display the moving multimedia data; and
  a mobile apparatus stand detachably connectable with the mobile electronic apparatus and comprising a data communication interface, a moving multimedia data storage reproducer, and a controller controlling a digital reproduction of the moving multimedia data and transmission of the digital moving multimedia data to the mobile electronic apparatus for display via the respective data communication interfaces, in response to an input reproduction command at the mobile electronic apparatus and/or at the mobile apparatus stand;
  wherein the mobile apparatus stand is detachably connectable with the mobile electronic apparatus, such that when the mobile electronic apparatus is connected to the mobile apparatus stand, the mobile electronic apparatus operates in conjunction with the mobile apparatus stand, and when the mobile electronic apparatus is disconnected from the mobile apparatus stand, the mobile electronic apparatus operates independently from the mobile apparatus stand.

* * * * *